(12) United States Patent
Uzun et al.

(10) Patent No.: US 7,774,506 B2
(45) Date of Patent: Aug. 10, 2010

(54) SYSTEMS AND METHODS FOR ALLEVIATING CLIENT OVER-SUBSCRIPTION IN RING NETWORKS

(75) Inventors: Necdet Uzun, Los Gatos, CA (US); Mike Takefman, Nepean (CA)

(73) Assignee: Cisco Technology, Inc., San Jose, CA (US)

(*) Notice: Subject to any disclaimer, the term of this patent is extended or adjusted under 35 U.S.C. 154(b) by 995 days.

(21) Appl. No.: 10/643,490

(22) Filed: Aug. 19, 2003

(65) Prior Publication Data
US 2005/0044272 A1 Feb. 24, 2005

(51) Int. Cl.
*G06F 15/16* (2006.01)
*G06F 15/173* (2006.01)
(52) U.S. Cl. .................. 709/251; 709/242; 709/233
(58) Field of Classification Search .......... 709/251, 709/242, 243, 233, 221
See application file for complete search history.

(56) References Cited

U.S. PATENT DOCUMENTS

| | | | |
|---|---|---|---|
| 5,247,626 A | 9/1993 | Firoozmand | 709/212 |
| 5,719,853 A | 2/1998 | Ikeda | 370/229 |
| 5,909,564 A | 6/1999 | Alexander et al. | 710/316 |
| 5,918,020 A * | 6/1999 | Blackard et al. | 709/228 |
| 6,026,075 A | 2/2000 | Linville et al. | 370/236 |
| 6,201,792 B1 | 3/2001 | Lahat | 370/236 |
| 6,292,834 B1 * | 9/2001 | Ravi et al. | 709/233 |
| 6,614,805 B1 * | 9/2003 | Raahemi et al. | 709/251 |
| 6,765,871 B1 * | 7/2004 | Knobel et al. | 370/231 |
| 6,910,079 B2 * | 6/2005 | Zimmermann et al. | 709/233 |
| 6,928,050 B2 * | 8/2005 | Lynch et al. | 370/224 |
| 7,088,675 B1 * | 8/2006 | Meyer | 709/221 |
| 7,102,997 B2 * | 9/2006 | Sultan et al. | 370/233 |
| 7,269,662 B2 | 9/2007 | Takeuchi et al. | 709/232 |
| 7,369,504 B2 | 5/2008 | Davis | 370/236.1 |

(Continued)

FOREIGN PATENT DOCUMENTS

EP 1061698 A2 12/2000

(Continued)

OTHER PUBLICATIONS

Resilient Packet Ring Alliance, A Summary and Overview of the IEEE 802.17 Resilient Packet Ring Standard, Printed from Internet: URL: http://www.rpralliance.org/articles/overview_of_draft_22.pdf> Retrieved on November 12, 2004, pp. 1-19.), Copyright RPR Alliance 2002, 2003.

(Continued)

*Primary Examiner*—Kevin Bates
(74) *Attorney, Agent, or Firm*—Campbell Stephenson LLP (57) ABSTRACT

Systems, methods, devices and techniques can be used in networks including resilient packet ring networks and other types of ring topology networks to adjust the flow of data traffic to MAC clients associated with stations on the network. In one example, adjusted fairness rates and/or messages associated with a network communication protocol are used to reduce traffic destined for a particular station and/or a MAC client associated with that station. In another example, station MAC clients or other components implement virtual destination queues and transmit information associated with the rate at which they receive data. The information and queues are used to reduce traffic destined for a particular station and/or a MAC client associated with that station.

55 Claims, 4 Drawing Sheets

U.S. PATENT DOCUMENTS

| | | |
|---|---|---|
| 7,379,422 B2 | 5/2008 | Nation .................... 370/230.1 |
| 7,385,995 B2 | 6/2008 | Stiscia et al. ................. 370/412 |
| 7,397,813 B2 | 7/2008 | Choe et al. .................. 370/438 |
| 7,486,614 B2 | 2/2009 | Yu .............................. 370/223 |
| 2002/0026502 A1* | 2/2002 | Phillips et al. .............. 709/219 |
| 2003/0076781 A1* | 4/2003 | Enomoto et al. ............ 370/229 |
| 2003/0163593 A1* | 8/2003 | Knightly ..................... 709/251 |
| 2004/0032826 A1 | 2/2004 | Sridhar ....................... 370/222 |
| 2004/0100984 A1 | 5/2004 | Nam et al. .................. 370/438 |
| 2006/0007854 A1* | 1/2006 | Yu .............................. 370/229 |

FOREIGN PATENT DOCUMENTS

| | | |
|---|---|---|
| WO | WO 00/52869 | 9/2000 |
| WO | WO01/67672 A2 | 9/2001 |

OTHER PUBLICATIONS

Resilient Packet Ring (RPR), IEEE *Draft* P802.17/D2.2, Apr. 9, 2003, Copyright 2002, 2003 by the Institute of Electrical and Electronics Engineers, Inc., only Chapters 1-9, pp. 1-232 are enclosed.

* cited by examiner

SYSTEMS AND METHODS FOR ALLEVIATING CLIENT OVER-SUBSCRIPTION IN RING NETWORKS

FIELD OF THE INVENTION

The present invention relates to communications devices, and particularly data frame transfer over ring networks.

BACKGROUND OF THE INVENTION

An important trend in networking is the migration of packet-based technologies from local area networks (LANs) to metropolitan area networks (MANs). In the simplest terms, a MAN is a network that spans a metropolitan area. Generally, a MAN spans a larger geographic area than a LAN, but a smaller geographic area than a wide area network (WAN). The rapidly increasing volume of data traffic in MANs is challenging the capacity limits of existing transport infrastructures based on circuit-oriented technologies such as SONET, SDH, and ATM. Inefficiencies associated with carrying increasing quantities of data traffic over voice-optimized circuit-switched networks makes it difficult to provision new services and increases the cost of building additional capacity beyond the limits of most carriers' capital expense budgets. Packet based transport technology is considered by many to be one of the best alternatives for scaling metropolitan networks to meet the demand.

One leading packet based transport technology is Ethernet. Various different standard Ethernet interfaces operate at 10 Mbps, 100 Mbps, and 1 Gbps, thus providing scalability of the service interface. Moreover, as nearly all Internet data packets begin and end as Ethernet frames, carrying data in a consistent packet format from start to finish throughout the entire transport path can eliminate the need for additional layers of protocol and synchronization that result in extra costs and complexities. In addition to efficient handling of IP packets, Ethernet has the advantages of familiarity, simplicity, and low cost.

Although Ethernet is well suited for point-to-point and mesh network topologies, it can be difficult to deploy Ethernet in ring configurations and as a shared media. Rings network configurations act as a shared media and typically use media access control (MAC) mechanisms to manage access across multiple users. Ethernet, in contrast, has evolved to support full duplex switched infrastructures and lacks this type of MAC mechanism. However, much of the existing optical fiber network infrastructure in metro areas is in ring form, largely because incumbent transport technologies, e.g., SONET, are typically deployed over fiber rings.

Ring topologies also enable SONET to implement a fast (sub 50 ms) protection mechanism that can restore connectivity using an alternate path around the ring in case of fiber cuts or equipment failure. Unlike SONET, Ethernet does not have a built-in fast protection mechanism. There are, therefore, great benefits in new technologies that can fully exploit fiber rings (in particular, ring resiliency) while retaining all the inherent advantages of a packet-based transport mechanism like Ethernet.

A number of emerging technologies target metro data transport applications. Among these are the Dynamic Packet Transport/Spatial Reuse Protocol (DPT/SRP) and the IEEE 802.17 Resilient Packet Ring (RPR) standard currently under development. Dynamic Packet Transport is a resilient packet ring technology designed to deliver scalable Internet service, reliable IP-aware optical transport, and simplified network operations. Principally for metropolitan area applications, DPT-based solutions allow service providers to cost effectively scale and distribute their Internet and IP services across a reliable optical packet ring infrastructure. DPT is based on SRP, which is a MAC-layer protocol developed by Cisco Systems for ring-based packet internetworking.

The IEEE 802.17 Resilient Packet Ring (RPR) standard, which may include aspects of both DPT and SRP, offers several important features that have heretofore been exclusive to SONET: efficient support for ring topology and fast recovery from fiber cuts and link failures. RPR technology is expected to provide data efficiency, simplicity, and cost advantages that are typical to Ethernet. In addition, RPR technology solves problems such as fairness and congestion control that have not been addressed by incumbent technologies.

Figure 1:
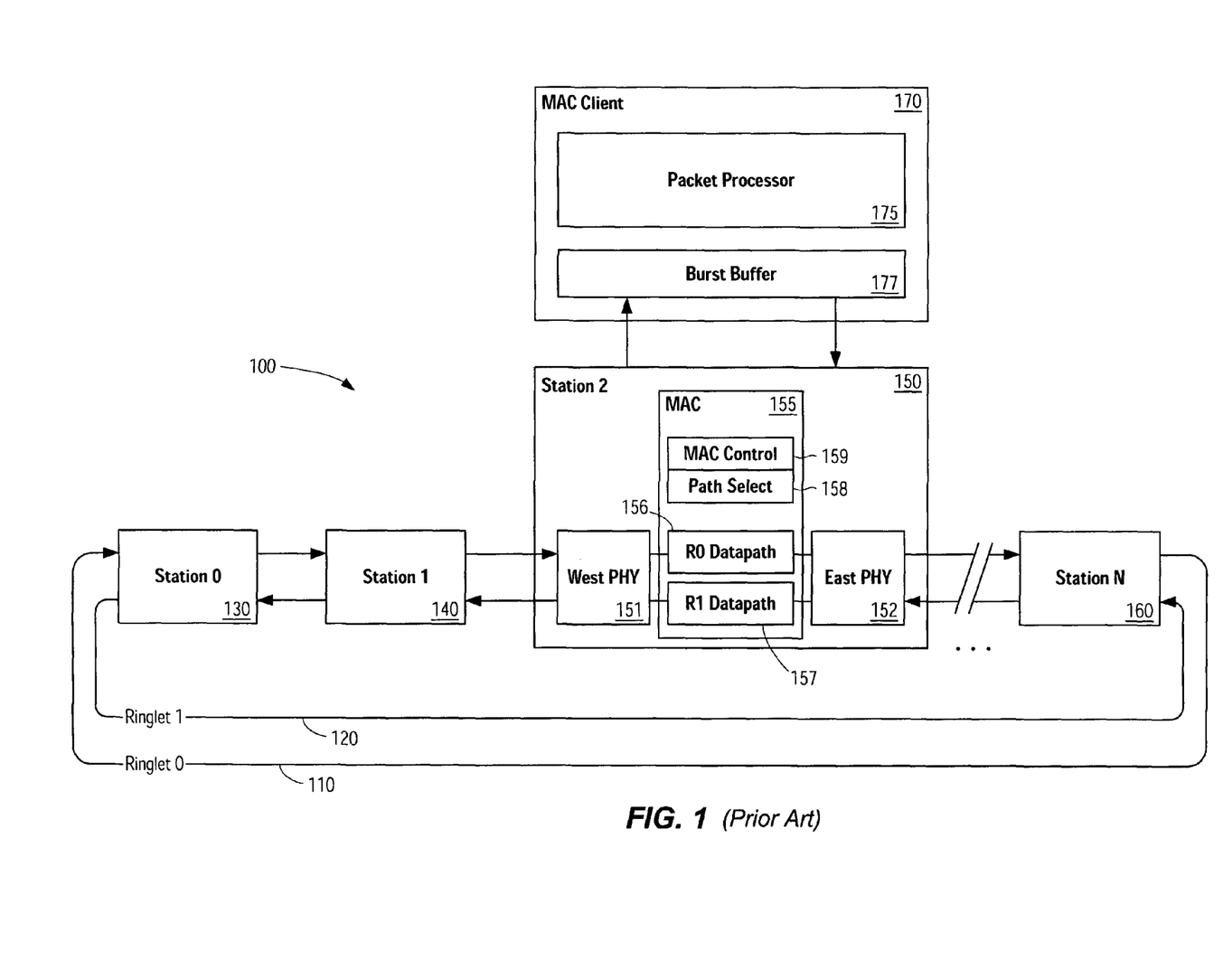
FIG. 1 illustrates a simplified block diagram of the ring and station structure of a resilient packet ring RPR network.

As outlined by the current draft IEEE 802.17 Resilient Packet Ring (RPR) standard (the "standard"), the RPR layer model can be described in terms of the open systems interconnect (OSI) reference model familiar to those having ordinary skill in the art. A simplified block diagram showing the ring and station structure of an RPR implementation is shown in FIG. 1.

Medium access control (MAC) control sublayer, MAC datapath sublayer, and reconciliation sublayers are specified within standard, as are the MAC service interface, and PHY service interface supported by the sublayers. The MAC service interface provides service primitives used by MAC clients to transfer data with one or more peer clients on an RPR ring, or to transfer local control information between the MAC and MAC client. The MAC control sublayer controls the datapath sublayer, maintains the MAC state and coordination with the MAC control sublayer of other RPR MACs, and transfer of data between the MAC and its client. The MAC datapath layer provides data transfer functions for each ringlet. The PHY service interface is used by the MAC to transmit and receive frames on the physical media. Distinct reconciliation sublayers specify mapping between specific PHYs and the medium independent interface (MII).

Resilient packet ring system 100 includes a number of ring stations (station 0 130, station 1 140, station 2 150, . . . and station N 160) interconnected by a ring structure utilizing unidirectional, counter-rotating ringlets. Each ringlet is made up of links between stations with data flow in the same direction. The ringlets are identified as ringlet0 110 and ringlet1 120. This standard allows a data frame to be transmitted on either of the two connected ringlets. For example, a unicast frame is inserted by a source station and copied by the destination station. For efficiency, the destination also strips the now irrelevant stale frame. The portion of a ring bounded by adjacent stations is called a span, and thus a span is composed of unidirectional links transmitting in opposite directions. The RPR dual-ring topology ensures that an alternate path between source station and destination station(s) is available following the failure of a single span or station. Fault response methods include pass-through and protection, as described in the standard.

In order to manage traffic and bandwidth on the ring, one or more fairness algorithms are implemented for data traffic designated as fairness eligible. In general, a station is not permitted to use more than its fair share of available capacity for the insertion of fairness eligible traffic when congestion has been detected on a ringlet. This restriction prevents a station from utilizing a disproportionate share of available capacity by virtue of its relative position on the ring. However, the algorithms specified assume that a client associated with a particular station, e.g., MAC client 170, can accept data at ring rate. If this is not the case, packets may get dropped before they get to packet processor 175 and/or the main buffers of the client where more intelligent dropping algorithms, e.g., the random early drop (RED) algorithm, can be used. One solution is to make intermediate buffers, such as burst buffer 177, very large so that packets are never dropped. However, the cost of adding sufficient memory to support such a solution makes it a less desirable solution.

Accordingly, it is desirable to have mechanisms by which data flow to ring station MAC clients can be controlled. Moreover, it is desirable that such mechanisms operate, to the extent possible, within existing and emerging ring transmission schemes.

SUMMARY OF THE INVENTION

It has been discovered that systems, methods, devices and techniques can be used in networks including resilient packet ring networks and other types of ring topology networks to adjust the flow of data traffic to MAC clients associated with stations on the network. In one example, adjusted fairness rates and/or messages associated with a network communication protocol are used to reduce traffic destined for a particular station and/or a MAC client associated with that station. In another example, station MAC clients or other components implement virtual destination queues and transmit information associated with the rate at which they receive data. The information and queues are used to reduce traffic destined for a particular station and/or a MAC client associated with that station.

Accordingly, one aspect of the present invention provides a method. Information is received indicating a need to change an amount of data being transmitted through a first media access control (MAC) device to a client of the first MAC device. A message is formed including an indication to a second MAC device to change a rate at which the second MAC device transmits data. The message is transmitted to the second MAC device over a network.

Another aspect of the present invention provides an apparatus including a first MAC device and a MAC client coupled to the first MAC device. The first MAC device is operable to be coupled to a network. The first MAC device includes control logic configured to prepare a message for transmission on the network including an indication to change a rate at which another MAC device transmits data. The MAC client includes a buffer for storing data transmitted to the MAC client and buffer control circuitry configured to provide information about an amount of data stored in the buffer.

Another aspect of the present invention provides another apparatus including a first MAC device. The first MAC device is operable to be coupled to a network and includes control logic, a buffer, and buffer control circuitry. The control logic is configured to prepare a message for transmission on the network including an indication to change a rate at which another MAC device transmits data. The buffer is for storing data transmitted to a MAC client. The buffer control circuitry is configured to provide information about an amount of data stored in the buffer.

Another aspect of the present invention provides another apparatus including a means for receiving information indicating a need to change an amount of data being transmitted through a first MAC device to a client of the first MAC device; a means for forming a message including an indication to a second MAC device to change a rate at which the second MAC device transmits data; and a means for transmitting the message to the second MAC device over a network.

Another aspect of the present invention provides a computer readable medium comprising program instructions executable on a processor, the computer readable medium being at least one of an electronic storage medium, a magnetic storage medium, an optical storage medium, and a communications medium conveying signals encoding the instructions. The program instructions are operable to implement each of: receiving information indicating a need to change an amount of data being transmitted through a first media access control (MAC) device to a client of the first MAC device; forming a message including an indication to a second MAC device to change a rate at which the second MAC device transmits data; and transmitting the message to the second MAC device over a network.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

The following sets forth a detailed description of at least the best contemplated mode for carrying out the one or more devices and/or processes described herein. The description is intended to be illustrative and should not be taken to be limiting.

It will be noted that the variable identifier "N" is used in FIG. 1 to more simply designate the final element (e.g., station N 160) of a series of related or similar elements. The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

Additionally, the systems, methods, devices, and techniques described in the present application will emphasize certain network communications concepts familiar to those having ordinary skill in the art. For example, a station as described herein can in general be any device attached to a network for the purpose of transmitting and/or receiving information on that network. Such stations typically include a media access control (MAC) device or entity, sometimes simply referred to as a "MAC", that is associated with the lower of the two sublayers of the data link layer defined by the IEEE and is responsible for, inter alia, managing protocol access to a physical network medium. A MAC device is typically implemented in hardware as one or more integrated circuits, e.g., ASICs, FPGAs, PLDs, microprocessors, microcontrollers, embedded processors, memory, etc., possibly in combination with software executing on the MAC device hardware. In general, a MAC client is a device or entity that invokes the service interface of a MAC device. Thus, a MAC client typically includes some combination of hardware and software that utilizes one or more MAC devices.

The systems, methods, apparatus and software of the present invention can be implemented in the context of network transport devices designed to be compliant with the IEEE 802.17 Resilient Packet Ring (RPR) standard, which is under development as of the filing of the present application. The current version of the standard is described in IEEE Draft P802.17/D2.2, *Resilient Packet Ring (RPR) Access Method & Physical Layer Specifications*, Apr. 9, 2003, which is hereby incorporated by reference herein in its entirety. However, the systems, methods, apparatus and software of the present invention need not be limited to RPR implementations. In general, the systems, methods, apparatus and software of the present invention can be utilized in the context of a variety of different networking structures and topologies.

Returning to FIG. 1, station 2 150 includes a MAC entity, MAC device 155, and two physical layer (PHY) devices west PHY 151 and east PHY 152. Each PHY is associated with a span, i.e., a network link capable of transmitting data from the PHY to the adjacent station and a network link capable of transmitting data from the adjacent station to the PHY, shared with a neighboring station. MAC device 155 includes a MAC control entity 159 and two MAC datapath entities 156 and 157, each of which is associated with a respective ringlet. MAC control 159 sends control frames to, and receives control frames from, each of the two MAC datapath instances 156 and 157. A path select entity 158 is used to direct data between MAC client 170 and the appropriate datapath entity. As will be understood by those having ordinary skill in the art, entities 156, 157, 158 and 159 can generally be formed from special purpose circuitry, general purpose circuitry executing one or more software programs or microcode, or some combination of the two. Moreover, the functionality of one or more of the entities can be combined into a single entity, e.g., path select 158 combined with MAC control 159, or further distributed into additional entities.

The PHY transmitting on ringlet0 and receiving on ringlet1 is typically identified as the east PHY, and the PHY transmitting on ringlet1 and receiving on ringlet0 is typically identified as the west PHY. The ringlet0 datapath receives frames from the west PHY and transmits or retransmits frames on the east PHY. Similarly, the ringlet1 datapath receives frames from the east PHY and transmits or retransmits frames on the west PHY.

Figure 2:
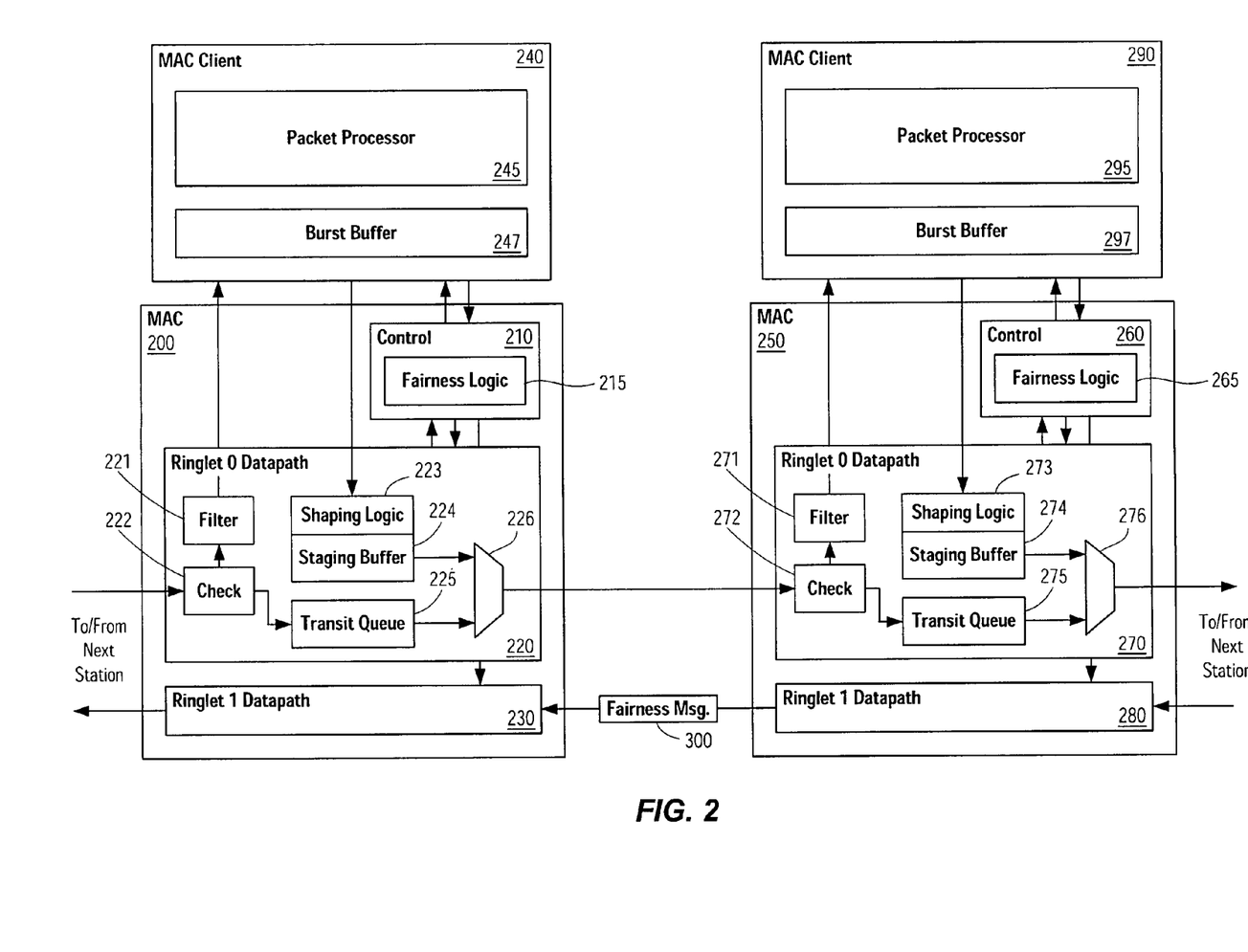
FIG. 2 illustrates a simplified block diagram of the MAC and MAC client corresponding to each of two stations in a ring network.

FIG. 2 illustrates a simplified block diagram of the MAC and MAC client corresponding to each of two stations in a ring network. For simplicity, other components associated with each station, e.g., PHYs, ringlet selection entities, and other MAC client components, are not shown. In this example, each station has essentially the same configuration of components. For example, MAC devices 200 and 250 each include a control circuit and/or software entity (210 and 260) and two MAC datapath entities (220, 230, 270, and 280) corresponding to the two network ringlets respectively. Similarly, each MAC has an associated MAC client (240 and 290). Although systems, methods, devices, and techniques described herein generally make use of similar functionality present in multiple network stations, it should be noted that there may be a variety of hardware and/or software differences from station to station and even from station component to station component. For example, MAC client 240 can be a very different device from MAC client 290. Still other hardware and software differences will be understood by those skilled in the art.

MAC control 210 and 260 supports control activities used to maintain the state of the corresponding MAC device and datapath activities not identified with a particular ringlet. In general, the RPR standard specifies that control activities be distributed among stations on a ring in order to survive any single point of failure. MAC Control entities 210 and 260 communicate with each other using the services of the MAC datapaths by, for example, passing specialized control message frames. Activities that can be performed by MAC Control 210 and 260 include: MAC service interface processing; fairness control, e.g., fairness frame processing using fairness logic 215 and 265; protection, e.g., when to deactivate a span interface; maintaining a topology database of attached stations; sending and receiving control frames on ringlet0/ringlet1 datapaths; and other operations, administration, and maintenance functionalities.

Topology discovery and topology database maintenance can be important to the systems, methods, devices, and techniques described herein by which data flow to ring station MAC clients can be controlled. More specifically, since operation of some of the systems, methods, devices, and techniques described herein can depend upon one station knowing whether or not another station can support certain features, it can be useful, although not necessary, that a station have the capability to discover and/or receive information about other stations. The RPR standard topology discovery algorithm describes rules for the broadcast of topology information contained in both protection and topology messages on the ring. These messages contain information about the originating station, and the configuration and capabilities making up the current topology image of that station. Such messages are typically generated on initial start of topology discovery, periodically, and on detection of a change in station or ring status.

In both MAC devices 200 and 250, ringlet0 datapaths 220 and 270 are illustrated in greater detail. In general, ringlet 1 datapaths 230 and 280 implement similar or identical functionality. The ringlet-specific datapath activities performed by each datapath typically include: insertion/deletion of RPR-specific fields on transmit/receive; per service class traffic shaping to regulate access to the shared ring network medium; staging of frames at their source and the queuing of transit frames; error checking, e.g., discarding corrupted, inconsistent, and expired time to live frames; and routing of received frames to the local client or control sublayer and stale-frame stripping.

As data frames are received by ringlet0 datapath 270 from MAC device 200, check logic 272 determines which frames are stripped, e.g., to be passed on to MAC client 290 or dropped altogether, from the data stream. Stripped frames not being dropped pass through filter logic 271. Filter logic 271 implements filter rules that affect which frames are copied to MAC client 290, which frames are copied to control components such as control 260, and in some cases which frames are discarded. Received frames that are to be retransmitted to the next station are stored in transit queue 275. Transit queue 275 may include one or more separate queues. For example, transit queue 275 can include a smaller primary transit queue and a larger secondary transit queue. In such an example, the two queues can handle different priority or different classes of traffic. Selection of which queue from which to dequeue data can be accomplished using multiplexer 276 under control of MAC control 260, or by logic within the transit queue itself.

Data frames inserted by MAC client 290 are typically transmitted from a MAC-resident stage buffer 274, rather than being transmitted directly from MAC client 290. This arrangement decouples MAC to MAC-client interface timings from the timings of the physical-layer interface. Flow control and prioritization protocols are therefore typically applied when frames are accepted into stage buffer 274, rather than when the staged frames are actually transmitted. Multiplexer 276 is used to select between staging buffer 274 and transit queue 275.

As noted above, data traffic can be shaped to regulate access to the shared ring network medium, and traffic shaping is handled by shaping logic 273. Shaping distinctions can be made among control frames and one or more classes of data frames. In one embodiment, control frames are shaped to a low transmission rate, to limit the jitter impact on MAC-client-supplied high priority transmissions. Client-supplied data frames are shaped to ensure conformance with pre-negotiated bandwidth allocations. Shaping generally involves monitoring transmitted frame bandwidths and sending flow-control indications to the MAC client. In general, shaping logic or a shaper is a device, e.g., a specialized circuit or a general performance circuit programmed to perform a particular function, that converts an arbitrary traffic flow to a smoothed traffic flow at a specified data rate. In so doing, the shaper "shapes" the traffic flow based on one or more parameters. Shaper can be part of queue control structure. For example, the device responsible for enqueuing and dequeuing data stored in the queue can also track shaping information and take enqueuing/dequeuing actions based on that information. Still other shaper or shaping logic implementations will be understood by those having ordinary skill in the art.

Fairness techniques are used to prevent a station from using more than its fair share of available capacity for the insertion of fairness eligible traffic when congestion has been detected on a ringlet. This restriction prevents a station from utilizing a disproportionate share of available capacity by virtue of its relative position on the ring. The rate restriction is enforced by shaping logic (223 and 273) within the MAC datapath sublayers. Fairness logic (215 and 265) implements the algorithm by, for example, performing needed calculations, providing information to shaping logic, and preparing fairness control messages to be sent to other stations. Fairness algorithms are not necessarily based on equal bandwidths, but can be based on distinct fairness weights assigned to each station. The nominal ratio of assigned bandwidth is proportional to the ratios of the stations' fairness weights.

In one embodiment, shaping parameters used by shaping logic 273 for fairness eligible traffic are computed using a distributed fairness algorithm. The fairness algorithm relies on fairness messages, such as fairness message 300, that are circulated periodically on the ringlet opposing that of the associated data traffic. A single choke fairness frame (SCFF) allows a station to advertise a fair rate value to its upstream neighbor. The fair rate received in an SCFF is input to the station's local fair rate computation. The rate advertised by an SCFF may originate with the local station or with a station lying further downstream. A multi choke fairness frame (MCFF) allows a station to broadcast its local fair rate in a form, typically normalized, that can be uniformly interpreted by all stations on the ringlet. "Single choke" is applied to information that can be used by a local station to identify no more than a single congestion point on a ringlet. "Multi choke" is applied to information that can be used by a MAC client to identify multiple congestion points on a ringlet. The structure of fairness messages will be described in grater detail below in conjunction with FIG. 3.

Although not illustrated, there is typically a fairness instance associated with each of the two ringlet datapaths. A fairness instance can be uniquely identified by the combination of the identity of the station, usually determined by the MAC address of the stations MAC device, and the identity of the ringlet carrying the data traffic whose rates are regulated by the fairness instance. In some cases, e.g., when a station is in the center-wrapped state as described by the RPR standard, the station includes a single fairness instance associated with both ringlets. A fairness instance computes a locally significant fair rate value that provides the basis for the computation of other rates that are communicated to other stations on the ringlet, to the MAC datapath, and to the MAC client. An administrative weight is assigned to each fairness instance to permit the scaling of fair rate values among stations on the ringlet. This allows one station to use a larger share of available capacity than another station without violating fairness principles. The capability of allowing such scaling is known as weighted fairness. A rate communicated from one station to another is typically normalized in order (1) to ensure that the rate is uniformly interpreted by stations on the ringlet and (2) to scale the rate value to allow it to be efficiently encoded as an integer value within a fair rate field of a fairness frame. Additionally, ramping describes the gradual increase or decrease of a rate. Fairness procedures typically make use of several ramping algorithms. Ramping methods usually employ a ramping coefficient that can be configured to increase or decrease the degree of ramping. The various algorithms and techniques used in support of RPR fairness are described in greater detail in the RPR standard. The systems, methods, devices, and techniques described herein can make use of and generally be used in conjunction with these fairness techniques. Moreover, the systems, methods, devices, and techniques described herein can further implement and/or utilize fairness algorithms and techniques not described in the RPR standard.

MAC devices 250 and 200 can further use fairness messages to communicate information related to data congestion at the MAC client level. In one embodiment, a MAC client, e.g., MAC client 290 determines that it is receiving data from its corresponding MAC device at a rate greater than desirable. For example, data received at MAC device 250 and destined for MAC client 290 is typically transmitted from MAC device 250 to burst buffer 297. As shown, burst buffer 297 is part of MAC client 290, but this need not be the case. As burst buffer 297 becomes congested, MAC device control 260 and/or fairness logic 265 will be so notified. For example, there may be several fullness threshold levels associated with burst buffer 297. Logic associated with burst buffer 297, other logic such as packet processor 295, or logic in MAC device 250 can compare the amount of data in burst buffer 297 with the threshold values. Depending on the comparison result, MAC device control 260, typically utilizing fairness logic 265, will calculate a special fairness rate to be transmitted by MAC device 250 to upstream stations. In general, a variety of other mechanisms can be used to indicate a need to reduce an amount of data being transmitted to MAC device 250. For example, counters can maintain count of data frames destined for MAC device 250 and use that information to determine if a rate of data arriving at MAC device 250 is greater than desired. In another example, some other element of MAC device 250, e.g., packet processor 295, and determine that it cannot keep up with the processing load associated with traffic destined for MAC device 250 and provide a corresponding indication indicating the need to reduce data traffic. Still other techniques will be understood by those having ordinary skill in the art.

Figure 3:
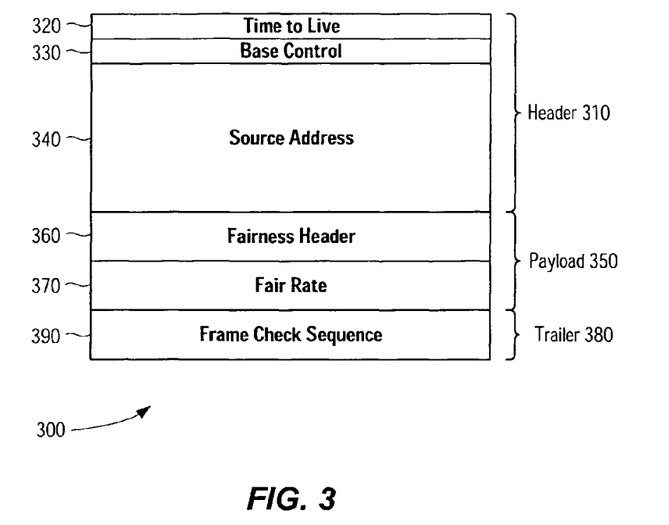
FIG. 3 illustrates an example of a fairness message.

In one embodiment, MAC device 250 will prepare a typical fairness message 300 to include the special fairness rate. In this case, the fairness message is identified as originating from MAC 250 and the special fairness rate is calculated to reduce the overall amount of data traffic directed at the station that includes MAC device 250. For example, the special fairness rate might be lower than the station's current fairness rate. Once upstream stations, such as the station containing MAC device 200, receive fairness message 300, they can use the information in the message to reduce the amount of traffic they send toward MAC device 250. Such a reduction might be accomplished, for example, by the station recalculating it own fairness rate. This embodiment is perhaps the simplest use of fairness messages to communicate information related to data congestion at the MAC client level. While it will have the desired effect of reducing data destined for MAC client 290, it accomplishes this at the expense of all data directed at the station including MAC device 250, i.e., that station's capacity for data not destined for MAC client 290 (transit data) will also be reduced. However, this approach can be used with any RPR standard compliant device. Additionally, variations on this technique can also be employed. Most notably, information other than a new fairness rate can be transmitted, e.g., a ramp rate, a message indicating that upstream stations should reduce data sent downstream, a flag, etc. In still other examples, the information is communicated to one or more stations using some other type of messaging system, protocol, or format.

In another embodiment, MAC device 250 will prepare a fairness message 300 to include the special fairness rate. In this case, the fairness message is identified as originating from a MAC device other than MAC 250, e.g., MAC device 200. The special fairness rate can be calculated to reduce the amount of data traffic destined for MAC client 290, or it may simply specify a lower fairness rate. The goal in this embodiment is to allow the station including MAC device 250 to retain its current bandwidth allocation while still reducing the data traffic destined for MAC client 290. In further variations of this embodiment, the fairness message can include a flag indicating that the station including MAC device 200 should pass the fairness message on to upstream stations without any change to the information in the message identifying the origin of the message. In such an example, MAC device 250 sets the flag, and MAC device 200 can then strip the flag from the fairness message and transmit the fairness message to upstream stations which will then assume that the message's contents originated at the station including MAC device 200. Once upstream stations receive fairness message 300, they can use the information in the message to reduce the amount of traffic they send toward MAC device 250. Such a reduction might be accomplished, for example, by the station recalculating it own fairness rate. As previously noted, a variety of variations on this technique can also be employed. Information other than a new fairness rate can be transmitted, e.g., a ramp rate, a message indicating that upstream stations should reduce data sent downstream, a flag, etc. In still other examples, the information is communicated to one or more stations using some other type of messaging system, protocol, or format.

In any of these embodiments, the special fairness rate and/or any other information that is transmitted to achieve the desired effects, can be determined in a variety of different ways. The special fairness rate may be determined based on one or more of oversubscription buffer occupancy, the rate at which traffic is received by MAC client 290, ring size, number of stations, and ring bandwidth. In another example, the special fairness rate is based on an estimation of the worst case situation encountered by the station including MAC device 250, i.e., where all other stations on the ring are sending frames to MAC client 290. In that case, the special fair rate used as the advertised fair rate for fairness message 300 can be determined by dividing the bandwidth of MAC client 290 by N where N is either the number of stations on the ring or a summation of all the weights on the ring in the case of weighted fairness algorithm implementations. In such an example, the fairness message can be used for both ringlets because the MAC client's bandwidth is typically consumed by data traffic from both ringlets. Alternately, the calculations can consider the bandwidth consumption associated with each ringlet separately.

Still another way of calculating the fair rate that will be advertised can be based on monitoring the source of all data frames received by MAC device 250. In such an implementation, station address (typically MAC device address) counters at the receive interface of MAC device 250 will determine how much data is received from each station on the ring, and allocate bandwidth accordingly, perhaps in a weighted fair manner. For example, the fair rate advertised might be the bandwidth of MAC client 290 divided by the sum of the weights of the active source stations. In yet another example, the fair rate advertised by MAC device 250 can simply be a predefined value such as a very small rate or even zero.

In general, any rate adjustment scheme can be used to communicate rate information to other ring stations that will have the effect of reducing the flow of data traffic to a MAC client. Conservative schemes as described, for example, in the RPR standard can take advantage of ramping techniques to gradually change transmission rates until congestion is adequately reduced. Aggressive schemes, also as described in the RPR standard can similarly be implemented. Moreover, in addition to functionality that sends one or more messages causing transmission rates to be reduced, similar messaging schemes can be used to signal that transmission rates previously reduced can now be increased.

FIG. 3 illustrates an example of the structure of fairness message 300. In this example, the structure of fairness message 300 follows guidelines specified in the RPR standard. In other examples, any structure that delivers the desired information can be used. In this example, the size of fairness message 300 is 16 bytes and the message is organized into three main parts: message header 310, message payload 350, and message trailer 380.

Header 310 includes three fields: time to live 320 (8 bits), base control 330 (8 bits), and source address 340 (48 bits). Time to live field 320 is a hop (the distance between adjacent stations) count that specifies the maximum number of hops the frame is expected to cover before reaching the destination. It is used to provide a mechanism to ensure that frames do not circulate forever on the ring. Base control field 330 includes a variety of sub-fields for specifying various frame options. For example, sub-fields in base control field 330 can be used to specify the type of frame (idle, control, fairness, data), whether or not the frame is fairness eligible, and the service class associated with the frame. Source address field 340 contains an individual MAC address specifying the station that generated the frame.

Payload 350 includes two fields: fairness header 360 (16 bits) and fair rate 370 (16 bits). Fairness header field 360 typically includes information about the type of fairness frame, e.g., single choke or multi-choke. Additional reserved space in fairness header 360 can be used for other information such as the information described above (flags, ramp rates, etc.) used to implement the systems, methods, devices, and techniques described herein. Fair rate field 370 contains the fairness rate (sometimes normalized) that is being transmitted by the fairness message. Finally trailer 380 includes frame check sequence 390 (32 bits) provides a cyclic redundancy check (CRC) of the frame and used for error correction purposes.

Figure 4:
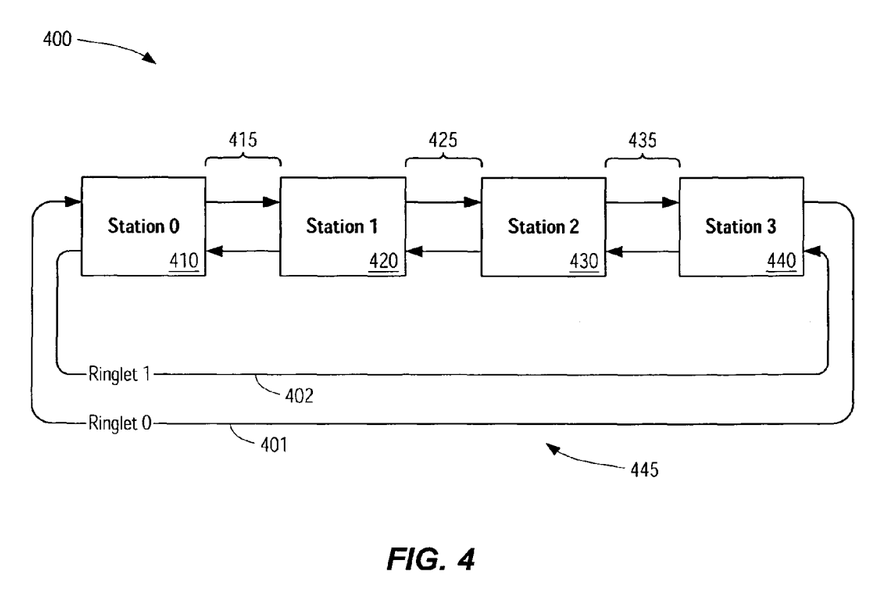
FIG. 4 illustrates a simplified block diagram of another ring and station structure of a ring network.

FIG. 4 illustrates a simplified block diagram of another ring and station structure of a ring network. In this example, network 400 is formed from two counter-transmitting ringlets, ringlet0 401 and ringlet1 402. Like resilient packet ring 100 illustrated in FIG. 1, network 400 can be an RPR network. network 400 includes four stations: station 0 410, station 1 420, station 2 430, and station 3 440. Each station is connected with and adjacent station by a network span (415, 425, 435, 445) that includes two network links each belonging to a respective ringlet and transmitting data in opposite directions. The simplified network illustrated in FIG. 4 implements still other mechanisms by which data flow to ring station MAC clients can be controlled.

Figure 5:
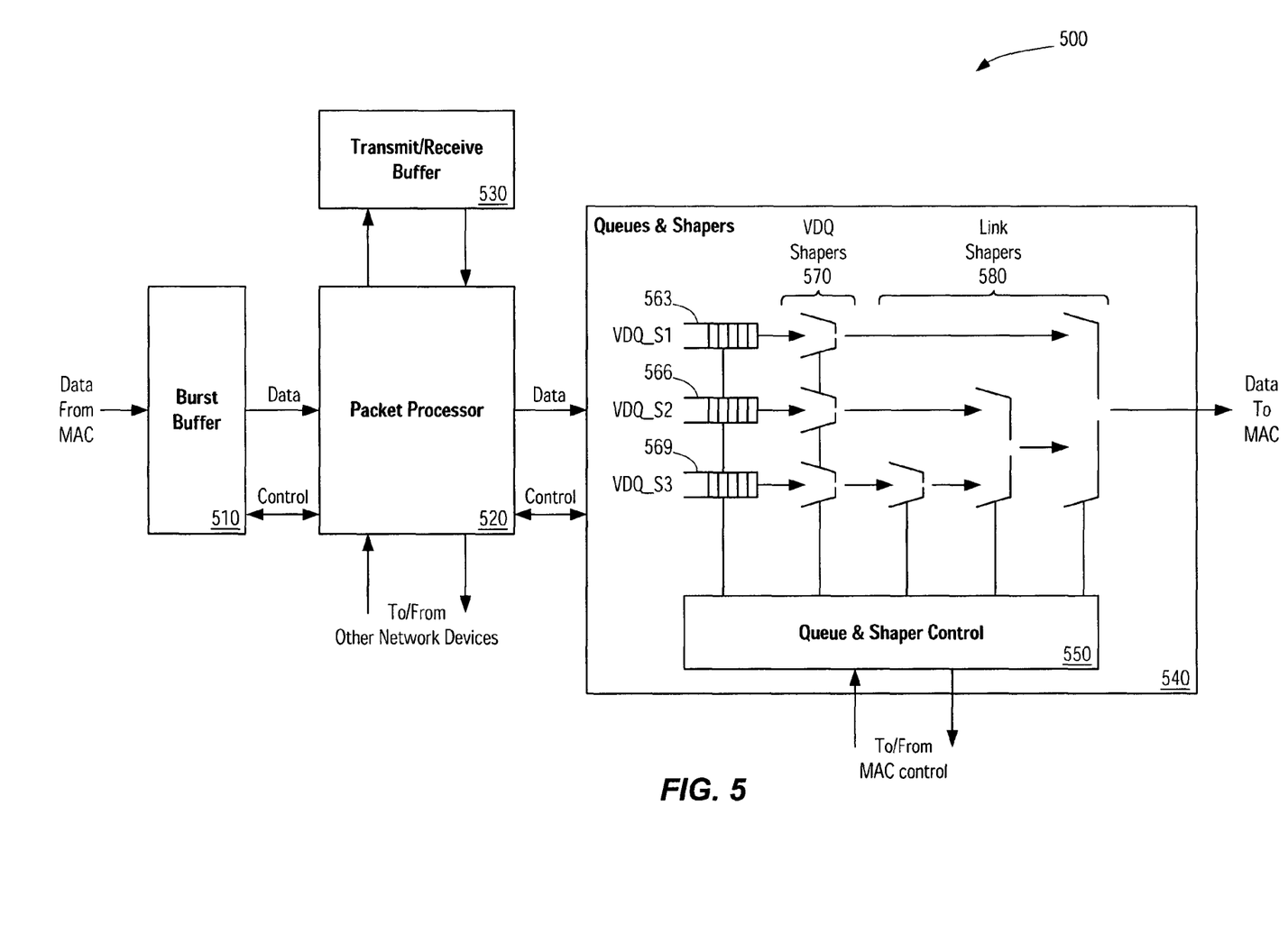
FIG. 5 illustrates a simplified block diagram of certain MAC client components associated with a station such as those shown in FIG. 4.

FIG. 5 illustrates a simplified block diagram of certain MAC client components 500 associated with station 0 410 of network 400 shown in FIG. 4. The MAC device used with MAC client components 500 can be conventional RPR standard MAC devices, MAC devices such as those illustrated in FIG. 2, or some other MAC device design. MAC client components 500 include a burst buffer 510 that receives incoming data frames from a corresponding MAC device. Data buffered by burst buffer 510 is processed by packet processor 520 which can posses any manner of packet processing functionality and can be implemented using some combination of integrated circuit hardware and/or software. In general, packet processor 520 is some manner of layer 3 processing engine. In processing packets, packet processor 520 typically sends and receives data to and from other communications devices. For example, packet processor 520 may be part of a LAN switching network and thus transmits data through a switching fabric to other network devices. Thus, MAC client components 500 may be part of a line card or other switching device. Network devices can, in general, include a variety of different devices including computer systems, output devices, storage devices, communications devices, or other network components such as routers, other switches, and even other networks.

Packet processor 520 typically operates in conjunction with some manner of additional buffering such as transmit/receive buffer 530. Transmit/receive buffer 530 facilitates packet processing by providing temporary data storage to packet processor 520. Such buffering can allow packet processor to more efficiently perform its primary task of routing data to an appropriate network device. For example, transmit/receive buffer 530 facilitates the implementation of certain congestion avoidance algorithms used to manage the data queue depth/latency. Examples of such algorithms include the random early detection (RED, sometimes also referred to as "Random Early Drop" or "Random Early Discard") algorithm and the weighted RED algorithm which ultimately determine if a packet should be enquired as requested, or dropped. Other algorithms and techniques can make use of buffering and queuing devices such as transmit/receive buffer 530.

In addition to the aforementioned MAC client components, MAC client components 500 include ring destination queues and shapers 540. Although illustrated as separate components, the hardware and/or software implementing this functionality can be part of another MAC client component, e.g., packet processor 520, or even part of an associated MAC device. Moreover, queues and shapers 540 are typically implemented in hardware as one or more integrated circuits, e.g., ASICs, FPGAs, PLDs, microprocessors, microcontrollers, embedded processors, memory, etc., possibly in combination with software executing on the hardware. Queues and shapers 540 include three virtual destination queues (VDQs) 563, 566, and 569, one for each possible destination station on ring network 400. Thus, there are VDQs corresponding to station 1 420 (VDQ_S1 563), station 2 430 (VDQ_S2 566), and station 3 440 (VDQ_S3 569). Since station 0 410 would typically not introduce data traffic destined for station 0 into either of the ringlets, there is no need for a VDQ corresponding to the station associated with MAC client components 500. VDQs 563, 566, and 569 are under the control of queue and shaper control logic 550.

VDQs 563, 566, and 569 are destined to allow regulation of data traffic destined for each of the other stations on the ring. In one embodiment, station 0 (and in particular queue and shaper control 550) receives information about the traffic handling ability, e.g., congestion, preferred transmission rate, etc., of the MAC client associated with each of the other ring stations and uses this information to control the flow of data destined for each other station. The received information about MAC client traffic handling ability typically takes the form of some indication of a need to reduce an amount of data being transmitted to the MAC device. Consequently, each MAC client supporting this scheme monitors traffic flow into the MAC client, e.g., burst buffer monitoring as described above, and uses that information to send appropriate messages to other stations on the ring. The messages can be transmitted using established RPR standard messages, e.g., fairness messages, or they can be communicated using any suitable communications protocol supported by the participating stations.

As previously noted, a MAC client can detect congestion in a variety of different ways including: monitoring burst buffer thresholds, counters, monitoring drop rates, and the like. Similarly, the information sent to other MAC clients and indicating the need to reduce the amount of traffic or rate of traffic for a particular MAC client can take a variety of forms including: specified data transmission rates, ramp factors, flags, rate decrease messages that specify no particular rate, and the like. Thus, it may be the case that a MAC client or MAC device receiving such information about congestion at another MAC client may determine for itself what the appropriate transmission rate should be. As information related to desired transmission rate is received from other stations, queue and shaper control 550 can control the rate data destined for each other ring station is transmitted to the station 0 MAC device and thus to the ring itself. Such control is further achieved using one or more rate shapers such as VDQ shapers 570 and link shapers 580

VDQ shapers 570 are designed specially to shape the flow of data destined for a particular station's MAC client. To that end, for each station's queue there is a corresponding VDQ shaper that controls data flow based on the information received from the corresponding station. Shapers or shaping logic can be implemented in a variety of ways as described above. Since each of the VDQs and VDQ shapers illustrated are specific to a single station, they can be used for data traffic to be inserted on either ringlet, i.e., there need not be separate VDQs and VDQ shapers for each datapath instance in the MAC device belonging to station 0. In other implementations, there may be multiple instances of the VDQs and VDQ shapers corresponding to different datapath instances. The rate shapers can implement various algorithms, such as the aforementioned fairness and weighted fairness algorithms (in either conservative or aggressive varieties). In one example, a destination station will advertise a rate or bandwidth based on the bandwidth it's MAC client can consume divided by the number of nodes in the ring. If the actual bandwidth being received is lower, the advertised value can be increased. Once the received bandwidth is near, at or above the sustainable rate, the advertised rate or bandwidth can be lowered. Information used to support such algorithms, e.g., fairness rates, ramp factors, flags, etc., is communicated as needed in messages as already described. Similarly, any calculations that need be performed can be handled by queue & shaper control 550, some other MAC client logic, MAC device logic, e.g., fairness logic, or some other portion of the ring network not illustrated.

In addition to VDQ shapers 570, link shapers 580 can also be implemented. Whereas VDQ shapers 570 shape transmission rates based on advertised MAC client receive rates (or some other similar information), link shapers 580 adjust data transmission based on bandwidth limitation of particular network links. In the example of FIG. 5, there are three link shapers illustrated, one corresponding to each of the three links of a single ringlet of network 400 upon which data from station 0 would be transmitted. For example, it is assumed that data transmitted by station 0 would be destined for one or more of station 1 420, station 2 430, and station 3 430. Since station 0 will typically not transmit data over the ring network to itself (although in some embodiments that can be supported with one or more additional VDQs, VDQ shapers, and/or link shapers), data transmitted by station 0 on a particular ringlet will traverse those links that do not end at station 0. Therefore, using ringlet 0 401 as an example, data transmitted by station 0 410 will only traverse links associated with spans 415, 425, and 435. Since data destined for station 1 420, i.e., data dequeued from VDQ_S2 563, need only traverse one link, it passes through as single link shaper associated with that link. Data destined for station 2 430 traverses both the previously described link and the corresponding ringlet's link in span 425, and so it passed through two link shapers, and so on.

Since link shapers 580 are programmed or controlled based on bandwidth limitations of a particular span or link, they may utilize information from station MAC clients, station MAC devices, and or network administrative sources. Additionally, that information can be distributed among stations using any of the communication or messaging schemes described herein or using other techniques known to those having skill in the art. Additionally, link shapers 580 can implement various algorithms, such as the aforementioned fairness and weighted fairness algorithms (in either conservative or aggressive varieties) or variations thereof. For example, link shapers 580 can be controlled using a multichoke fairness algorithm and multi-choke fairness frames as described above and in the RPR standard.

As illustrated, link shapers 580 correspond to the links associated with a single ringlet, and thus there may be the need for additionally link shaper instances corresponding to the links of the other ringlet. In another embodiment, span shapers are used instead of link shapers. Span shapers can take the bandwidth restriction of complete ring spans into consideration, thereby eliminating the need for separate shapers for each of the two MAC datapath instances.

Since queuing and shaping techniques associated with queues and shapers 540 is not explicitly a part of the RPR standard, or indeed any communication protocol or standard, it may be necessary to implement topology and functionality discovery techniques, as are well known in the art, so that one or more stations can determine which if any other stations in a ring network can support the queuing and shaping techniques. In the event that some but not all of a ring network's stations can support some or all of VDQs, VDQ shapers, and link shapers, the number of VDQs and shapers implemented may change. For example, if only three stations on a ring network support this functionality, then there may be VDQs in one of those stations only for the other two supporting stations. Similarly, there can be multiple VDQs and/or shapers implemented to correspond to a single station, link, or span. For example, there can be two or more VDQs corresponding to a single station so that different traffic priorities can be accommodated. In such an example, a single VDQ shaper would typically shape all traffic coming from the multiple queues corresponding to the single destination station, but this need not be the case.

Moreover, just as queues and shapers 540 can be used to reduce traffic destined for a particular MAC client, so to can they be used to increase traffic to a particular MAC client, e.g., once that MAC client indicates that congestion has been reduced.

It should also be noted that various techniques described herein can be used in conjunction with each other. For example, if a station finds that VDQs and related functionality are not supported by one or more stations in a network, the techniques described in conjunction with FIGS. 2 and 3 may still be used to achieve some control over MAC client congestion.

Additionally, a variety of different techniques can be used to determine the fair rates, ramp factors, or other information indicating the need to reduce traffic targeting a particular MAC client. These techniques may have equal applicability to any of the systems, methods, devices, and techniques descried herein. In one example, described below, a conservative fairness algorithm determines new fair rates based on a number of factors including the extent to which a burst buffer or VDQ is full, receive rates for both fairness enabled and non-fairness enabled traffic, current fairness rates, and ramp coefficients.

In this example, one or more thresholds can be established such that when the relevant buffer or queue capacity exceeds or falls below the threshold(s), a new fairness rate is calculated based on a corresponding ramp factor. A first threshold represents a buffer/queue capacity below which the buffer/queue could tolerate significantly more traffic, e.g., a "hungry" case, and above which the buffer/queue could tolerate some additional traffic but is generally satisfied. A second threshold represents a buffer/queue capacity below which the buffer/queue is in the satisfied state, and above which the buffer/queue is in a "full" state indicating the need to reduce the amount of traffic. Additional or fewer thresholds and thus capacity states could similarly be implemented.

As the buffer/queue capacity drops below the first threshold, i.e., into the hungry state, an new ramp factor will be calculated so as to lead to an increase in traffic:

$$RampFactor = + \frac{MaxRcvRate - (RcvdFERate + RcvdNonFERate)}{MaxRcvRate \times RampCoeff},$$

where MaxRcvRate is the maximum rate at which the relevant MAC client component, e.g., a packet processor, can receive data, RcvdFERate, is the rate at which fairness eligible data is received, RcvdNonFERate, is the rate at which non-fairness eligible data is received, and RampCoeff is a coefficient used to adjust the granularity of the ramping. Note that any of these rates can be raw data rates, normalized data rates, filtered data rates (e.g., low pass filtered), or the like. Once the RampFactor is determined, a new fairness rate can be calculated:

$$FairRate=FairRate(1+RampFactor).$$

Similarly, as the buffer/queue capacity rises above the first threshold, i.e., from the hungry state into the satisfied state, an new ramp factor can be calculated so as to lead to a decrease in traffic:

$$RampFactor = -\frac{RcvdFERate}{(RcvdFERate + FwdRate) \times RampCoeff},$$

where FwdRate is the rate at which fairness enabled traffic is transitted (forwarded) through the MAC device. Using this RampFactor, a new fairness rate is calculated as shown above. In situations that might be considered more critical, e.g., as the buffer/queue capacity rises above the second threshold, i.e., from the satisfied state into the full state, the amount of the ramp can be further increased multiplying the RampFactor by a constant greater than one, e.g., two.

Again, this example is merely illustrative of the techniques that can be used to determine new fairness rates or other information used to adjust the rate at which traffic is received at a MAC client. Other techniques for determining fairness rates, ramp factors, or any other relevant parameters will be known to those having skill in the art.

The figures illustrate some of the many mechanisms by which data flow to ring station MAC clients can be controlled as disclosed in the present application. Those having ordinary skill in the art will readily recognize that certain steps, elements or operations illustrated can be eliminated or implemented in an alternate arrangement or order. Moreover, the many of the techniques described herein are typically implemented as one or more software programs or microcode for a computer system or programmable device and may be encoded in a computer readable medium as instructions executable on one or more processors, FPGAs, ASICs, or the like. The computer readable medium can be any one of an electronic storage medium, a magnetic storage medium, an optical storage medium, and a communications medium conveying signals encoding the instructions. Separate instances of these programs can be executed on separate computer systems in keeping with the multi-process methods described above. Thus, although certain steps have been described as being performed by certain devices, software programs, processes, or entities, this need not be the case and a variety of alternative implementations will be understood by those having ordinary skill in the art.

In the most general sense, the networks and devices described herein transport data in the form of frames. A frame is a logical grouping of information sent as a data link layer unit over a transmission medium. Frames typically include header and/or trailer information, used for synchronization and error control, that surrounds user data contained in the unit. The terms cell, datagram, message, packet and segment are also used to describe logical information groupings at various layers of the OSI reference model and in various technology circles. As used herein, the term "frame" should be understood in its broadest sense, and can encompass other terms such as cell, datagram, message, packet and segment.

Although the present invention has been described with respect to a specific preferred embodiment thereof, various changes and modifications may be suggested to one skilled in the art and it is intended that the present invention encompass such changes and modifications that fall within the scope of the appended claims.

What is claimed is:

1. A method comprising:
   receiving information at a first media access control (MAC) device from a client of the first MAC device, wherein
      the information indicates a need to change an amount of data being transmitted through the first MAC device to the client of the first MAC device, and
      the client generates the information in response to the client determining that the client is receiving data at a rate exceeding a set threshold;
   forming a message including an indication to a second MAC device to change a rate at which the second MAC device transmits data to the client, wherein the first MAC device forms the message,
      said forming the message uses the information indicating the need to change the amount of data being transmitted to the client,
      said forming the message is performed in response to receiving said information,
      the message identifies the second MAC device as originating the message, and
      a total bandwidth allocation of the first MAC device is unaffected by said change; and
   transmitting the message to the second MAC device over a network.

2. The method of claim 1 wherein the network is a metropolitan area network (MAN).

3. The method of claim 1 wherein the network is a resilient packet ring (RPR) network.

4. The method of claim 1 wherein the network includes a first datapath for transmitting data from the first MAC device to the second MAC device, and wherein the network includes a second datapath for transmitting data from the second MAC device to the first MAC device.

5. The method of claim 1 wherein the message is a resilient packet ring (RPR) fairness message.

6. The method of claim 1 further comprising:
   determining an extent to which a data buffer associated with the client of the first MAC device contains data; and
   preparing the information indicating the need to change the amount of data being transmitted through the first MAC device to the client of the first MAC device based on the extent to which the data buffer associated with the client of the first MAC device contains data.

7. The method of claim 6 further comprising:
   transmitting, to the first MAC device, the information indicating the need to change the amount of data being transmitted through the first MAC device to the client of the first MAC device.

8. The method of claim 1 wherein the message further includes a MAC device address.

9. The method of claim 8 wherein the MAC device address corresponds to one of the first MAC device, the second MAC device, and another MAC device.

10. The method of claim 1 wherein the indication to the second MAC device to change the rate at which the second MAC device transmits data includes at least one of: a MAC device address, a data transmission rate, a ramp factor, and a flag.

11. The method of claim 1 wherein the indication to the second MAC device to change the rate at which the second MAC device transmits data includes a data transmission rate, the method further comprising:
determining the data transmission rate.

12. The method of claim 11 wherein the determining the data transmission rate further comprises at least one of:
calculating the data transmission rate;
selecting a value for the data transmission rate; and
determining a ramp factor.

13. The method of claim 1 further comprising:
transmitting the message from the second MAC device to a third MAC device.

14. The method of claim 1 wherein the first MAC device is part of a first resilient packet ring (RPR) station and wherein the second MAC device is part of a second RPR station.

15. The method of claim 1 wherein the information indicating the need to change the amount of data being transmitted through the first MAC device to the client of the first MAC device includes at least one of: a data transmission rate, a counter value, a message indicating that a buffer threshold has been exceeded, and a signal from the client of the first MAC.

16. The method of claim 1 wherein:
the information indicating the need to change the amount of data being transmitted through the first MAC device to the client of the first MAC device further comprises at least one of: information indicating the need to reduce the amount of data being transmitted, and information indicating the need to increase the amount of data being transmitted; and
the indication to the second MAC device to change the rate at which the second MAC device transmits data further comprises at least one of: an indication to the second MAC device to reduce the rate at which the second MAC device transmits data, and an indication to the second MAC device to increase the rate at which the second MAC device transmits data.

17. The method of claim 1 encoded in a computer readable medium as instructions executable on a processor, the computer readable medium being one of an electronic storage medium, a magnetic storage medium, and an optical storage medium.

18. An apparatus comprising:
a first media access control (MAC) device operable to be coupled to a network, wherein
the first MAC device is operable to receive information from a MAC client coupled to the first MAC device,
the first MAC device includes control logic configured to prepare a message for transmission on the network, wherein
the message includes an indication to change a rate at which another MAC device transmits data to the MAC client coupled to the first MAC device,
the message identifies the another MAC device as originating the message, and
a total bandwidth allocation of the first MAC device is unaffected by said change; and
the MAC client coupled to the first MAC device, wherein the MAC client comprises
a buffer for storing data transmitted to the MAC client and
buffer control circuitry configured to provide information about an amount of data stored in the buffer, wherein
the buffer control circuitry is configured to provide the information about an amount of data stored in the buffer in response to determining that the MAC client is receiving information at a rate exceeding a set threshold, and
the control logic is responsive to the information about the amount of data stored in the buffer to prepare the message.

19. The apparatus of claim 18 wherein the network is a metropolitan area network (MAN).

20. The apparatus of claim 18 wherein the network is a resilient packet ring (RPR) network.

21. The apparatus of claim 18 further comprising:
a second MAC device, wherein the second MAC device is the another MAC device;
a first datapath coupled between the first MAC device and the second MAC device, the first datapath for transmitting data from the first MAC device to the second MAC device; and
a second datapath coupled between the first MAC device and the second MAC device, the second datapath for transmitting data from the second MAC device to the first MAC device.

22. The apparatus of claim 21 wherein the first MAC device is further operable to transmit the message to the second MAC device.

23. The apparatus of claim 21 wherein the second MAC device is configured to transmit the message to a third MAC device.

24. The apparatus of claim 21 wherein the first MAC device is part of a first resilient packet ring (RPR) station and wherein the second MAC device is part of a second RPR station.

25. The apparatus of claim 18 wherein the message is a resilient packet ring (RPR) fairness message.

26. The apparatus of claim 18 wherein the buffer control circuitry is coupled to the control logic, and wherein the control logic is further configured to use the information about the amount of data stored in the buffer to determine the indication to change the rate at which another MAC device transmits data.

27. The apparatus of claim 18 wherein the message further includes a MAC device address.

28. The apparatus of claim 27 wherein the MAC device address corresponds to one of the first MAC device and the another MAC device.

29. The apparatus of claim 18 wherein the indication to change the rate at which another MAC device transmits data includes at least one of: a MAC device address, a data transmission rate, a ramp factor, and a flag.

30. The apparatus of claim 18 wherein the control circuitry is further configured to determine at least one of a data transmission rate and a data transmission rate ramp.

31. The apparatus of claim 18 wherein the information about an amount of data stored in the buffer includes at least one of: a data transmission rate, a counter value, a message indicating that a buffer threshold has been exceeded, and a signal from the client of the first MAC.

32. The apparatus of claim 18 wherein MAC client further comprises packet processing circuitry coupled to the buffer.

33. The apparatus of claim 32 wherein the packet processing circuitry includes the buffer control circuitry.

34. The apparatus of claim 18 wherein the indication to change the rate at which another MAC device transmits data further comprises at least one of an indication to reduce the rate at which another MAC device transmits data, and an indication to increase the rate at which another MAC device transmits data.

35. An apparatus comprising:
a first media access control (MAC) device coupled to a network;
a client of the first MAC device coupled to the first MAC device;
a means for receiving information at the first MAC device from the client of the first MAC device indicating a need to change an amount of data being transmitted through the first media access control (MAC) device to the client of the first MAC device, wherein
the client generates the information in response to the client determining that the client is receiving data at a rate exceeding a set threshold;
a means for forming a message including an indication to a second MAC device to change a rate at which the second MAC device transmits data to the client, wherein
said first MAC device comprises said means for forming the message,
said means for forming the message uses the information indicating the need to change the amount of data being transmitted to the client,
said forming the message is performed in response to receiving said information,
the message identifies the second MAC device as originating the message, and
a total bandwidth allocation of the first MAC device is unaffected by said change; and
a means for transmitting the message to the second MAC device over the network.

36. The apparatus of claim 35 wherein the network is at least one of a metropolitan area network (MAN) and a resilient packet ring (RPR) network.

37. The apparatus of claim 35 wherein the message is a resilient packet ring (RPR) fairness message.

38. The apparatus of claim 35 further comprising:
a means for determining an extent to which a data buffer associated with the client of the first MAC device contains data; and
a means for preparing the information indicating the need to change the amount of data being transmitted through the first MAC device to the client of the first MAC device based on the extent to which the data buffer associated with the client of the first MAC device contains data.

39. The apparatus of claim 35 wherein the message further includes a MAC device address.

40. The apparatus of claim 35 wherein the indication to the second MAC device to change the rate at which the second MAC device transmits data includes at least one of: a MAC device address, a data transmission rate, a ramp factor, and a flag.

41. The apparatus of claim 35 wherein the information indicating the need to change the amount of data being transmitted through the first MAC device to the client of the first MAC device includes at least one of: a data transmission rate, a counter value, a message indicating that a buffer threshold has been exceeded, and a signal from the client of the first MAC.

42. The apparatus of claim 35 wherein:
the information indicating the need to change the amount of data being transmitted through the first MAC device to the client of the first MAC device further comprises at least one of information indicating the need to reduce the amount of data being transmitted, and information indicating the need to increase the amount of data being transmitted; and
the indication to the second MAC device to change the rate at which the second MAC device transmits data further comprises at least one of: an indication to the second MAC device to reduce the rate at which the second MAC device transmits data, and an indication to the second MAC device to increase the rate at which the second MAC device transmits data.

43. A computer readable medium comprising program instructions executable on a processor, the computer readable medium being at least one of an electronic storage medium, a magnetic storage medium, and an optical storage medium, wherein the program instructions are operable to implement each of:
receiving information at a first media access control (MAC) device from a client of the first MAC device, wherein
the information indicates a need to change an amount of data being transmitted through the first MAC device to the client of the first MAC device, and
the client generates the information in response to the client determining that the client is receiving data at a rate exceeding a set threshold;
forming a message including an indication to a second MAC device to change a rate at which the second MAC device transmits data to the client, wherein the first MAC device forms the message,
said forming the message uses the information indicating the need to change the amount of data being transmitted to the client,
said forming the message is performed in response to receiving said information,
the message identifies the second MAC device as originating the message, and
transmitting the message to the second MAC device over a network.

44. The computer readable medium of claim 43 wherein the network is at least one of a metropolitan area network (MAN) and a resilient packet ring (RPR) network.

45. The computer readable medium of claim 43 wherein the message is a resilient packet ring (RPR) fairness message.

46. The computer readable medium of claim 43 further comprising program instructions operable to implement:
determining an extent to which a data buffer associated with the client of the first MAC device contains data; and
preparing the information indicating the need to change the amount of data being transmitted through the first MAC device to the client of the first MAC device based on the extent to which the data buffer associated with the client of the first MAC device contains data.

47. The computer readable medium of claim 46 further comprising program instructions operable to implement:
transmitting, to the first MAC device, the information indicating the need to change the amount of data being transmitted through the first MAC device to the client of the first MAC device.

48. The computer readable medium of claim 43 wherein the message further includes a MAC device address.

49. The computer readable medium of claim 48 wherein the MAC device address corresponds to one of the first MAC device, the second MAC device, and another MAC device.

50. The computer readable medium of claim 43 wherein the indication to the second MAC device to change the rate at which the second MAC device transmits data includes at least one of: a MAC device address, a data transmission rate, a ramp factor, and a flag.

51. The computer readable medium of claim 43 wherein the indication to the second MAC device to change the rate at which the second MAC device transmits data includes a data transmission rate, the method further comprising:
  determining the data transmission rate.

52. The computer readable medium of claim 43 further comprising program instructions operable to implement at least one of:
  calculating the data transmission rate;
  selecting a value for the data transmission rate; and
  determining a ramp factor.

53. The computer readable medium of claim 43 further comprising program instructions operable to implement:
  transmitting the message from the second MAC device to a third MAC device.

54. The computer readable medium of claim 43 wherein the information indicating the need to change the amount of data being transmitted through the first MAC device to the client of the first MAC device includes at least one of: a data transmission rate, a counter value, a message indicating that a buffer threshold has been exceeded, and a signal from the client of the first MAC.

55. The computer readable medium of claim 43 wherein:
  the information indicating the need to change the amount of data being transmitted through the first MAC device to the client of the first MAC device further comprises at least one of: information indicating the need to reduce the amount of data being transmitted, and information indicating the need to increase the amount of data being transmitted; and
  the indication to the second MAC device to change the rate at which the second MAC device transmits data further comprises at least one of: an indication to the second MAC device to reduce the rate at which the second MAC device transmits data, and an indication to the second MAC device to increase the rate at which the second MAC device transmits data.

\* \* \* \* \*